UNITED STATES PATENT OFFICE.

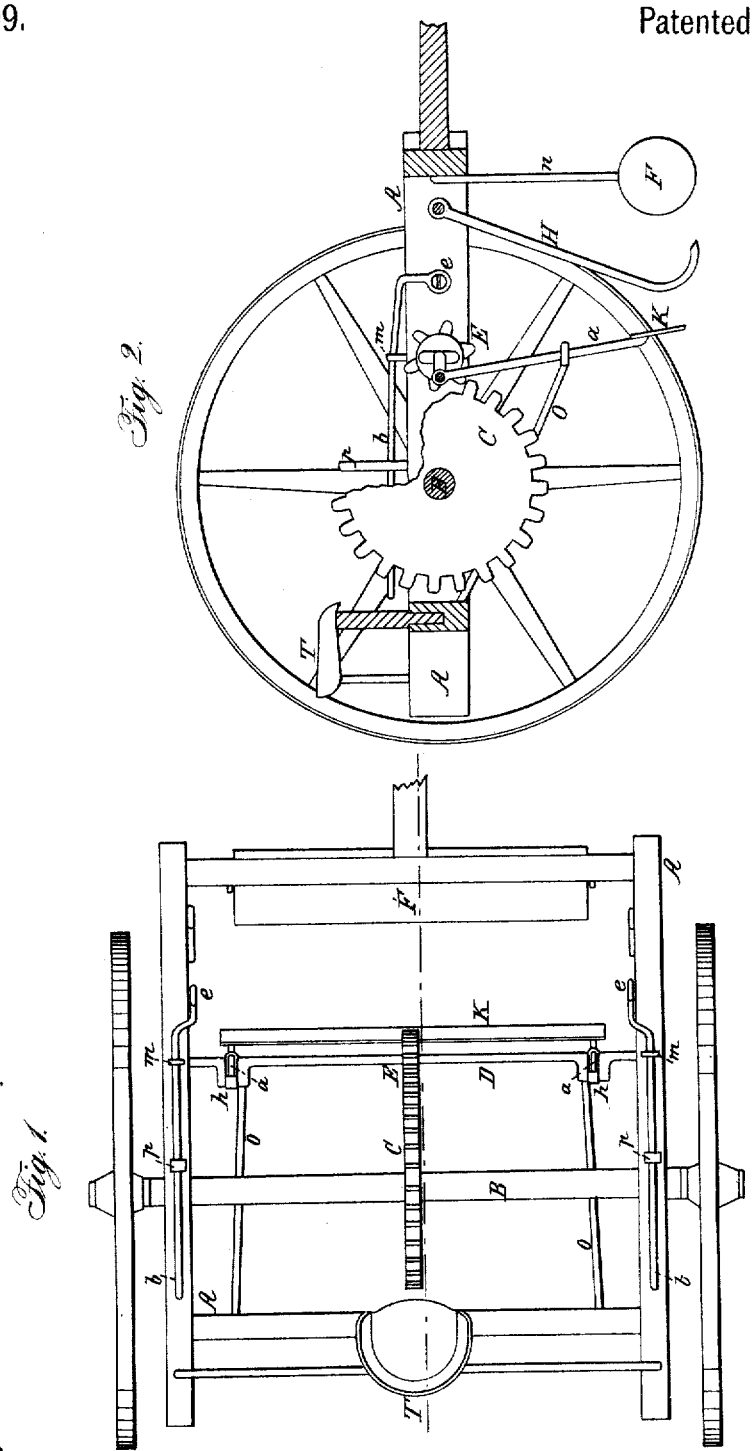

W. F. STARNES, OF MACOMB, ILLINOIS.

IMPROVEMENT IN MACHINES FOR CUTTING STALKS IN THE FIELD.

Specification forming part of Letters Patent No. 58,909, dated October 16, 1866.

*To all whom it may concern:*

Be it known that I, WILLIAM F. STARNES, of Macomb, in the county of McDonough and State of Illinois, have invented certain new and useful Improvements in Corn-Stalk Cutters; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention relates to that class of machines intended for clearing corn-stalks out of the way in the field preparatory to sowing grain therein; and it consists in arranging, in connection with a frame mounted on wheels, a roller for breaking down the stalks, and a knife, operated by mechanism, for cutting up the same as they lie on the ground.

Figure 1 is a top-plan view, and Fig. 2 a longitudinal vertical section of the same.

A represents a frame mounted on two wheels, similar to an ordinary wheeled cultivator, one of the wheels being secured to the axle B, so that as the implement is drawn forward the axle shall turn with the wheel, and thus impart motion to the spur-wheel C, mounted thereon.

The wheel C gears into a pinion, E, secured to a crank-shaft, D, located in front of the axle B. This shaft D has a crank, h, near each end, as shown in Fig. 1, and to each of these cranks h a rod, a, is attached, projecting downward through an eye or guide on the end of the oblique rod or brace o, as shown more clearly in Fig. 2. To the lower end of these rods a is attached a cutting-blade, K, which extends horizontally nearly across the machine.

The side pieces of the frame A have a vertical slot cut in them where the shaft D passes through them, as shown in Fig. 2, the shaft having its bearings in the movable pieces m, which latter, at their upper ends, are connected to the levers b, the levers being pivoted at e, and having their rear ends secured by notches in the studs p.

By lowering the levers b the shaft D will be depressed and thrown into gear with the wheel C, by which operation, also, the knife K will be thrown down so as to reach the ground, and at the same time have imparted to it a reciprocating motion.

F represents a roller, secured underneath the front end of the frame in a position to nearly reach the ground, for the purpose of bending or breaking down the row of stalks as it is drawn forward over the row.

H represents a strong hook, pivoted, as shown in Fig. 2, one at each side of the frame A, just in rear of the roller F, the object of which is to gather up any stalks that may fall off on either side, and straighten them around in front of the knife K, so that the latter shall be sure to cut them as the machine passes along.

The operation consists simply in drawing the machine along over the rows of stalks, the roller F serving to bend or break down the stalks, the hooks H straightening and gathering them in at the sides, and the knife K cutting or chopping them up into short pieces.

The driver is to occupy the seat T, where he can guide the team and raise or lower the knife whenever desired.

Having thus described my invention, what I claim is—

1. The roller F and the hooks H, arranged as shown, to break down and straighten the stalks, as set forth.

2. The reciprocating knife K, operated by the crank-shaft D and the gear-wheels E and C, for the purpose of cutting the stalks, as set forth.

W. F. STARNES.

Witnesses:
 JOHN W. STARNES,
 ALLEN W. GRAY.